United States Patent [19]

Evans et al.

[11] 4,036,453
[45] July 19, 1977

[54] WIDE ANGLE TORQUING SCHEME

[75] Inventors: John Lorenz Evans, Oakland; Bart Joseph Zoltan, Old Tappan, both of N.J.

[73] Assignee: The Singer Company, Little Falls, N.J.

[21] Appl. No.: 647,224

[22] Filed: Jan. 7, 1976

[51] Int. Cl.[2] .................... F41G 7/00; G01C 19/28; G01C 19/12; G01C 19/24
[52] U.S. Cl. ................................. 244/3.16; 74/5.1; 74/5.4; 74/5.6 A; 74/5.7
[58] Field of Search ............... 74/5.1, 5.4, 5.7; 244/3.16

[56] References Cited
U.S. PATENT DOCUMENTS

| | | | |
|---|---|---|---|
| 2,527,245 | 10/1950 | Cunningham et al. | 74/5.7 |
| 2,600,476 | 6/1952 | Bursack | 74/5.7 |
| 3,260,122 | 7/1966 | Rocks | 74/5.7 |
| 3,824,865 | 7/1974 | Evans et al. | 74/5.7 |
| 3,920,200 | 11/1975 | Evans et al. | 244/3.16 |

*Primary Examiner*—Stephen C. Bentley
*Assistant Examiner*—Thomas H. Webb

*Attorney, Agent, or Firm*—Laurence A. Wright; Thomas W. Kennedy

[57] ABSTRACT

A torquer system for a gyro device that has a spherically shaped rotor divided into upper and lower hemispheres. The rotor of the gyro is mounted on a gas bearing over a spherically shaped stator and supports an optical assembly positioned parallel to the spin axis of the gyro. The torquer is positioned on the base of the gyro beneath the lower hemisphere of the rotor so as to permit the maximum angular freedom of the rotor and optical assembly. The torquer comprises four pole pieces separated 90° from each other. Each torquer has two pole faces and coils located between pole faces. The coils contain separate windings for bias and control of the torquer. A current flow through the windings of the torquers causes magnetic flux lines emanating from the pole faces to pass through magnetically permeable material affixed to the lower hemisphere of the gyro rotor closing the magnetic circuit. The rotor will be attracted towards the pole face and the magnitude of the force of attraction is indicative of the current passing through the torquer windings.

6 Claims, 4 Drawing Figures

WIDE ANGLE TORQUING SCHEME

This invention is related to gyro optical devices. More particularly, this invention is related to a torquing system for a gyro optical device which provide a large angular freedom for the device.

BACKGROUND OF THE INVENTION

Electromagnetic methods of torquing gyroscopes include variable reluctance torquers and rotating polarized magnets placed in the field of a solenoid which is energized at various times during a single revolution of the gyroscope magnet assembly. One disadvantage of present electromagnetic torquers especially as applied in spherical gas gyroscopes used for optical terminal guidance is that they require a very large magnetic return path as part of the gyro rotor. Magnetic materials exhibit high density and the requirement of a large return path increases the mass and inertia of the gas suspended gyro rotor. Also present design requires the return path to be a two piece assembly of the magnetic upper and lower hemispheres. This results in losses due to the magnetomotive force required to overcome the reluctance of the joint.

Another disadvantage of prior art electromagnetic torquers is that in gyro optical systems there is a requirement that the optical element or assembly be made part of the gyroscopic element. An optical aperture, as large as possible, is desired on such systems. These optics are placed on the spin axis and protrude from the spherical rotor. In variable reluctance torquers taught by the prior art, the angular freedom of the rotor was severly constrained by the wrap around torquers, which would collide with the optical assembly. See for example, the gyro optical device disclosed in U.S. Pat. No. 3,920,200. The present invention satisfies the need for increased angular freedom and increased apertures.

BRIEF DESCRIPTION OF THE INVENTION

The present invention comprises an electromagnetic torquer system of the variable reluctance type having four torquer poles each torquer is made up of two pole faces connected by an electromagnetic wound component assembly. There are two coil windings on each pole, a bias winding and a control winding. The bias coils of each of the four torquers are connected in series. However, the control coils while connected in series are poled in the opposite sense. The four torquers are spaced 90° apart and positioned around the lower hemisphere of the gyro optical device in order to slew the rotor. Opposite torquers, 180° apart, operate in complementary pairs. The torquers operate on ac or dc current and are used to slew spin axis to any position within a 20° half cone angle about the longitudinal axis of the projectile on which it is mounted. A current flow through the windings of the torquers causes magnetic flux lines emanating from the pole faces to pass through permeable material affixed to the lower hemisphere of the gyro rotor closing the magnetic circuit. The rotor will be attracted towards the pole face and the magnitude of the force of attraction is indicative of the current passing through the torquer windings.

Accordingly, it is an object of this invention to provide a torquer which permits a large angular freedom for the gyroscope.

It is another object of this invention to provide a torquer and gyroscope which reduces the suspended mass and rotor inertia as well as increasing the space for winding of the coils required to activate the torquers.

It is a further object of this invention to provide a torquer for a gyroscope which reduces the power required to attain a fixed level of torque.

These and other objects, features and advantages of the present invention will become apparent from the following description taken in conjunction with the accompanying drawings (not to scale) wherein.

Figure 1:
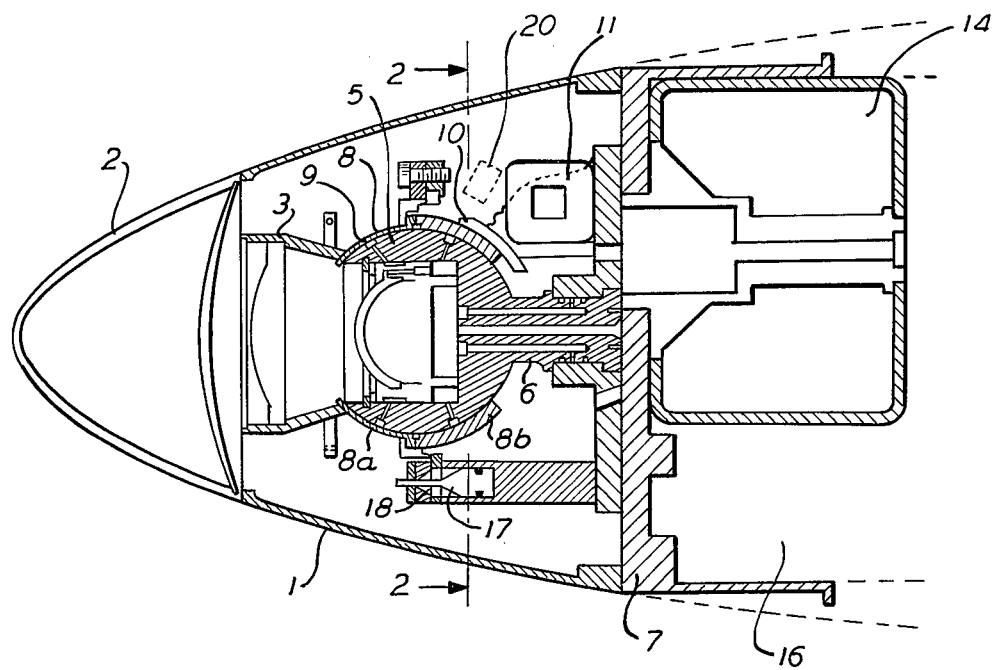
FIG. 1 is a cross-sectional view of an optical gyro system wherein the torquer of the invention may be employed.

Referring to FIG. 1, there is shown a schematic of an optical gyro in which the torquer system of the present invention may be employed. Since the components of the optical gyro shown in FIG. 1 but for the torquer system are known in the art they will be discussed only briefly herein in relation to the torquer system of the invention. The gyro optical assembly is contained in a cover 1 which is fitted over the nose section of a projectile (not shown). A dome-shaped window 2 permits light and other radiation to impinge upon the optical assembly 3 of the device. The gyro rotor 8 is mounted on gas bearings on a spherically shaped hollow stator 5 which has its pedestal 6 mounted on base 7.

The gyro has a pair of optical pickoffs 20 which may operate in the pulse duration modulated (PDM) mode. Each pickoff is located on-axis and operates on light reflected from the rotor to produce an output signal that varies as the function of the gimbal angle $\theta$.

The caging mechanism consisting of caging piston 17 and caging ring 18 provide instantaneous release of the rotor early in the spin up transient. The details of the caging mechanism is discussed in U.S. Pat. application Ser. No. 524,456 filed Nov. 18, 1974.

Figure 4:
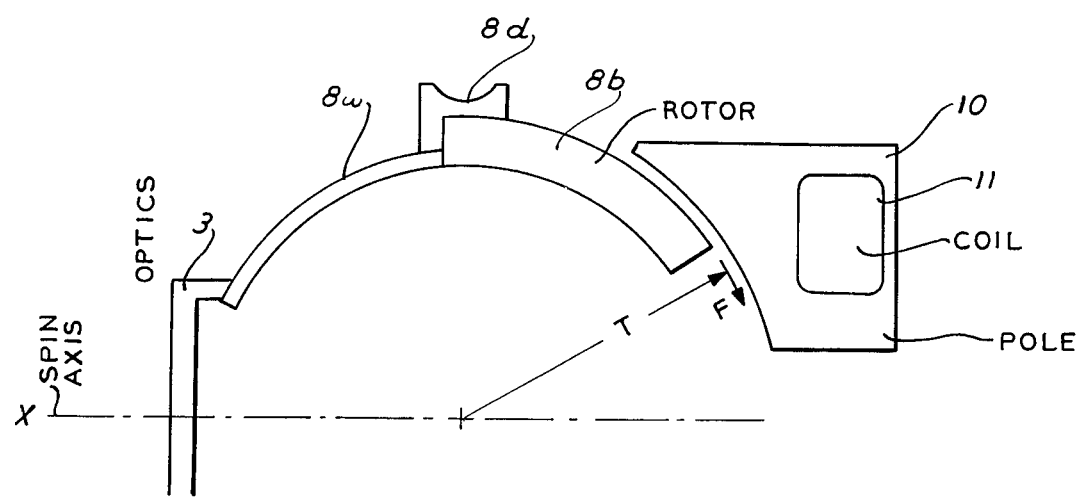
FIG. 4 is a schematic view showing the force acting on the rotor due to the excitation of the torquer coils.

Spin-up gas supply 16 supplies gas to hollow spherical rotor 8 by impinging on a multiplicity of turbine buckets 8d located at the equator of the rotor (see FIG. 4). The main gas supply 14 is used to provide gas for the gas bearing surface between the rotor and stator.

The rotor 8 of the gyro is spherically shaped and surrounds the stator bearing with openings at its North pole for the optical assembly and at its South pole for the insertion of the stator pedestal. A plurality of orifices 9 form passages in the stator and are provided to supply gas to the bearing for supporting the rotor. The rotor 8 is divided into a non magnetic upper hemispheric section 8a made of a light weight material and a lower hemispheric section 8b made of magnetically permeable material. Alternately the lower hemispheric section may have a band of permeable material around its periphery adjacent the torquer pole faces 10. It is to be noted that since the present invention does not require a two piece rotor assembly of magnetic upper and lower hemispheric sections there are no losses due to magnetomotive force required to overcome the reluctance of the joint between the two hemispheres. Furtherfore, in the present invention the torquer poles do not wrap around the upper and lower hemispheres of the rotor. Thus, this invention provides increased, angular freedom and increases optical apertures, because the torquers are positioned so as not to collide with the optical assembly.

Earlier techniques for applying variable permeance torques to wide angle gyroscopes utilized pole pieces in the form of the letter C. This pole shape required pole faced to be quite close to the rotor in two latitudinal planes, one above and one below the equator of the rotor. Since the clearance between the pole faces and rotor is small and the angular displacement between the equator and the latitudinal planes is large, it became impossible to remove the rotor for any reason without first removing the torquers. This is undesirable because the removal of the torquers is in itself time consuming and the replacing and adjusting them after the rotor was replaced is a major part of the assembly effort.

This invention completely eliminates this problem. No part of the torquer extends above the equator. Therefore the rotor can be removed and replaced at will without any adjustment of the mechanical positioning of the torquers.

Figure 2:
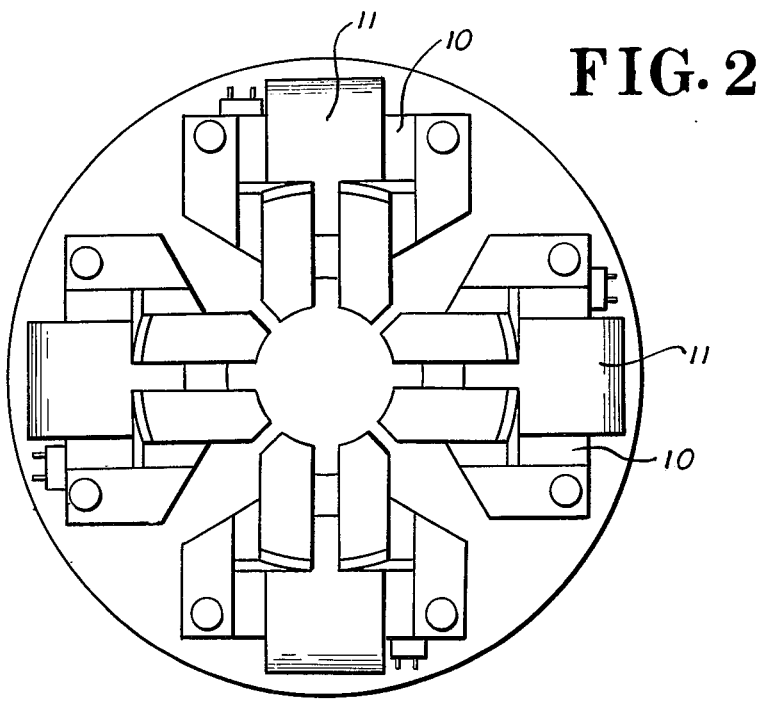
FIG. 2 is a cross sectional view taken along the line 2—2 of FIG. 1 with stator and caging assembly removed showing the position of the four torquer poles at the base of the spherical gyro.

Referring to FIG. 2 it is seen that there are four torquer poles 10 which are spaced 90° apart. Two torquers, 180° apart, operate in complementary pairs. The torquers operate on ac or dc current and are used to slew the gyro spin axis to any position within a 20° half cone angle about the longitudinal axis of the projectile on which the gyro is mounted.

Figure 3:
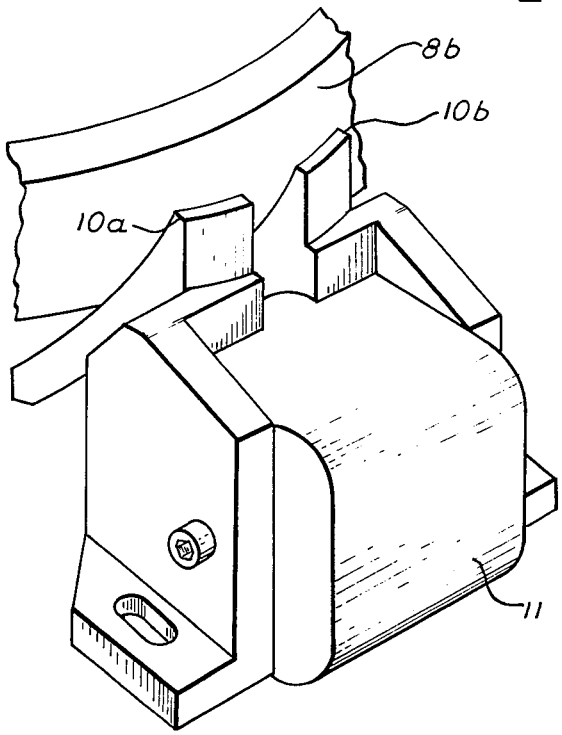
FIG. 3 is a perspective view of one torquer.

Referring to FIG. 3, it is seen that each torquer has two adjacent pole faces 10a and 10b with an iron-core coil 11 between them. The magnetic flux path is through the pole face 10a, across the air gap between the rotor and pole face 10a and through the lower rotor hemisphere again across the air gap to pole face 10b. When the torquer coil is energized, each torquer assembly tends to increase the energy in the air gap. Thus, a tangential force $F_y$ is developed which, when multiplied by the moment arm as shown in FIG. 4 produces a torque of magnitude T. The tangential force $F_y$ is not itself a linear function of torquer control current. However, the torque can be made a linear function of control current by operating two torquers assemblies in push-pull. Each torquer assembly contains a bias coil and a control coil (not shown).

The magnetic flux of the bias and control windings can be made additive of subtractive as determined by the sense of the currents vis-a-vis one another. The bias coils are in series with one another while the control coils are connected in series but in an opposite sense. Therefore, when a fixed bias current is present, a control current has the effect of adding flux in one assembly while subtracting in the other. The result is that the tangential force in one assembly is increased while in the other it is decreased. This has the effect of linearizing the net torque with control current, and cancelling common mode errors.

The linear relationships between control current and torque are developed by the following equations: The force $F_y$ can be found by determining the gradient of potential energy, W, in the meridianal, or the y direction. Let the energy stored in the air gap between the rotor and pole face be represented by $$W = \phi^2 h/s = B^2 sh = B^2 ahy$$

where
W = stored energy
$\phi$ = flux in the gap
h = gap length in the direction of the lines of flux
s = area of the pole face
B = flux density in the gap
a = pole face spacing
y = length of pole face overlap over the rotor The force in the y direction can be found by determining the gradient of potential energy considering Y as a variable Thus:

$$F_y = (\delta W/\delta Y)$$

Therefore, $F_y = B^2 ah$. But B is proportional to the ampere-turns NI of the coil; also torque is equal to $F_y R$ where R is the radius of the rotor.
Letting $K_1 = Rah$ = constant one obtains:

$$T = K_1 (NI)^2$$

Since each torquer assembly has two coils, let:
$N_E$ = turns in excitation coil
$I_E$ = current in excitation coil
$N_C$ = turns in control coil
$I_C$ = current in control coil
Then, the torques $T_1$ and $T_2$ are equal to the expression $$K (N_E I_E \pm N_c I_c)^2$$

depending on the sense of the control current, and the total torque of the system becomes:

$$T = T_1 - T_2 = K(N_E I_E + N_c I_c)^2 = 4K N_E I_E N_c I_c$$

For normal operation, $I_E$ is set at a constant and $N_E$, $N_c$ and K are fixed by design, then:

$$T = K_2 I_c$$

Thus, torque is indeed proportional to control current.

The torquing capability of the present invention is in the order of 46,000 dyne-cm. This torque is limited by magnetic saturation of the stator cores between the stator poles. As a result of torquer stability versus temperature considerations, constant current supplies will be used for both excitation and control circuits. In this case, the torquing rate will be almost constant with respect to temperature. There will be a very small positive change due to the permeability of iron, and possibly some small effect due to variations in the gap. However, the major source of error, the variation of coil resistance with temperature has no effect.

Torquer linearity as defined by the math model described above is perfect. However two mechanisms not considered in the model can produce deviations. These are saturation effects and fringe permeance. The present invention minimizes saturation effects and the entire path lies in the lower rotor hemisphere which is adequately thick to avoid saturation for all planned flux levels. Fringe permeance effects which result in positional nonlinearity have also been significantly suppressed in the present invention. Maximum linearity deviations of 5% from an ideal scale factor are predicted at an angle of 13°.

The torquer magnetic circuit seeks a position of minimum energy or least reluctance. So long as the rate of change of permeance is constant with rotor angle, the torque is constant regardless of rotor position for a given torquing current. Using two such torquers per axis, bidirectional torquing is achieved. As shown in FIG. 2 four such torquer assemblies are required for a two axis gyroscope. In operation, the gyroscope can be torqued to any position by passing appropriate currents through the torquer control windings. The torquer current required to maintain the gyro at null or pointing at a target can be monitored if required to provide target line of sight rate information.

Advantages of the present invention are greater gyroscopic angular freedom than prior art devices, reduced suspended mass and rotor inertia, increased room for winding of coils required to activate the torquers, possibility of assembling torquer on the gyro base prior to mounting the rotor on the base which was impossible with prior art design and improved linearity and cross coupling over prior art design. These features taken collectively reduce the power required to attain a fixed level of torque.

From the foregoing, a variable reluctance torquer system has been described. While a particular embodiment of the invention has been shown and described, modifications may be made and it is intended in the following claims to cover the embodiments which fall within the true spirit and scope of the invention.

We claim:

1. In an optical gyroscope device having a spherically shaped rotor mounted on gas bearings, a torquer system comprising:
   a plurality of torquer pole pieces positioned around the lower rotor hemisphere of said gyroscope,
   a bias coil, said bias coil establishing a flux field about said pole pieces when an excitation current is permitted to flow therethrough,
   a control coil, said control coil, establishing a flux field about said pole pieces caused by a current commanding movement of the rotor of said gyroscope, and
   magnetically permeable means affixed to said lower rotor hemisphere facing said poles pieces and separated by a narrow gap from said pole pieces for closing the magnetic circuit between the pole faces of said pole pieces.

2. The optical gyroscopic device of claim 1 comprising:
   four torquer pole pieces separated 90° from each other around the lower roter hemisphere of said gyroscope, each of said pole pieces having two pole faces separated from each other.

3. In an optical gyroscope device having a spherically shaped rotor mounted on gas bearings, a torquer system comprising:
   four torquer pole pieces separated 90° from each other around the base of the rotor of said gyroscope each of said pole pieces having two pole faces separated from each other,
   a bias coil said bias coil establishing a flux field about said pole pieces when an excitation current is permitted to flow therethrough,
   a control coil said control coil establishing a flux field about said pole pieces caused by a current commanding movement of the rotor of said gyroscope, and
   a band of magnetically permeable material affixed to the lower rotor hemisphere below the equator of the rotor of said gyroscope facing said pole pieces and separated by a narrow gap from said pole pieces for closing the magnetic circuit between the pole faces of said pole pieces.

4. In an optical gyroscope device having a spherically shaped rotor mounted on gas bearings, a torquer system comprising:
   an upper rotor hemispheric section made of a light weight non-magnetic material,
   a magnetically permeable lower rotor hemispheric section connected to said upper rotor hemispheric section forming a connection at the equator of said rotor,
   four torquer pole pieces separated 90° from each other around the base of the rotor of said gyroscope each of said pole pieces having two pole faces separated from each other,
   a bias coil said bias coil establishing a flux field about said pole pieces when an excitation current is permitted to flow therethrough, and
   a control coil said control coil establishing a flux field about said pole pieces caused by a current commanding movement of the rotor of said gyroscope said magnetically permeable lower rotor hemispheric section facing said pole pieces and separated by a narrow gap from said pole pieces for closing the magnetic circuit between the pole faces of said pole pieces.

5. In a gyro device having a spherically shaped hollow rotor divided into upper and lower hemispheric sections, which is mounted on a gas bearing over a spherically shaped hollow stator, wherein the rotor of the gyro supports an optical assembly which is positioned parallel to the spin axis of the gyro, a torquer system for torquing the rotor and optical assembly comprising:
   four torquer pole pieces separated 90° from each other mounted on the base of said gyro and positioned beneath the lower hemispheric section of said rotor,
   a bias coil, said bias coil establishing a stable flux field about said torquer pole pieces when an excitation current flows therethrough,
   a control coil, said control coil establishing a flux field through said torquer pole pieces for commanding said rotor motion, said motive torque created by the flux of said control coil being proportional to the control coil current passing through the torquer windings, opposing pairs of torquers acting in a push pull fashion on said rotor, and
   a band of magnetically permeable material affixed to the lower hemispheric section of the rotor facing said torquer pole pieces across a narrow gap for closing the magnetic circuit between the pole faces of said pole pieces.

6. The method of assembling a gyro device having a base, four torquer assemblies spaced 90° from each other, a spherically shaped hollow stator having a cylindrical member forming a pedestal connected to the rearward section of the stator, a spherically shaped hollow rotor divided into upper and lower hemispheric sections mounted on gas bearings on the stator, an optical assembly having an optical sensing means mounted in a central opening of the stator and an optical focusing means mounted in a central opening of the rotor comprising:
   removably affixing the torquer assemblies to the base,
   removably mounting the lower hemispheric rotor section on the gas bearing surface of the rearward section of the stator,
   removably inserting the optical sensing means in the central opening of the stator,
   removably mounting the optical focusing means in the central opening of the upper hemispheric rotor section,
   removably fastening the upper and lower hemispheric rotor sections around the forward and rearward sections respectively of the stator,
   aligning the optical assembly with the spin axis of the rotor, and
   removably affixing the pedestal of the stator to the base so that the torquer assemblies surround the lower rotor hemisphere below the equator of the rotor.

* * * * *